United States Patent [19]
Bauman et al.

[11] Patent Number: 6,049,845
[45] Date of Patent: Apr. 11, 2000

[54] SYSTEM AND METHOD FOR PROVIDING SPECULATIVE ARBITRATION FOR TRANSFERRING DATA

[75] Inventors: Mitchell A. Bauman, Circle Pines, Minn.; Joseph S. Schibinger, Phoenixville, Pa.; Donald R. Kalvestrand, Lansdale, Pa.; Douglas E. Morrissey, Allentown, Pa.

[73] Assignee: Unisys Corporation, Blue Bell, Pa.

[21] Appl. No.: 08/964,630

[22] Filed: Nov. 5, 1997

[51] Int. Cl.⁷ ........................................................ G06F 13/00
[52] U.S. Cl. .............................. 710/113; 710/27; 710/241
[58] Field of Search ................................. 710/20–26, 27, 710/58, 73, 74, 113, 243, 241, 100, 107, 129

[56] References Cited

U.S. PATENT DOCUMENTS

| 3,641,505 | 2/1972 | Artz et al. ............................. | 340/172.5 |
| 3,768,074 | 10/1973 | Sharp et al. .......................... | 340/172.5 |
| 3,812,469 | 5/1974 | Hauck et al. ......................... | 340/172.5 |
| 4,000,485 | 12/1976 | Barlow et al. ........................ | 340/172.5 |

(List continued on next page.)

FOREIGN PATENT DOCUMENTS

| 0 752 667 | 1/1997 | European Pat. Off. . |
| WO 95/25306 | 9/1996 | WIPO . |
| WO 96/35172 | 11/1996 | WIPO . |

OTHER PUBLICATIONS

IBM Technical Disclosure Bulletin, "Compact Global Table for Management of Multiple Caches," vol. 32, No. 7, Dec. 1, 1989, pp. 322–324.

Fred R. Goldstein, "Congestion Control in Frame Relay Networks Using Explicit Binary Feedback," Conference Proceedings, Mar. 27–30, 1991, pp. 558–564.

Burroughs Corporation, "B6800" Multiprocessor Systems, Aug. 21, 1979, B 6000 Series System Notes, Mark III.1 Release, Sep. 1979, pp. 53–84.

Stenstrom, et al., "Boosting Performance of Shared Memory Multiprocessors," Computer, Jul. 1997, pp. 63–70.

"Exemplar System Architecture" from http://www.hp.com/wsg/products/servers/exemplar/sx–class/exemplar.htm, Downloaded Feb. 12, 1998. (Date of publication unkown).

Stenstrom et al., "Trends in Shared Memory Multiprocessing", Computer, Dec. 1997, pp. 44–50.

M.S. Yousif, et al., "Cache Coherence in Multiprocessor: A Survey," Advances in Computers, vol. 10, 1995, pp. 127–179.

Primary Examiner—Xuan M. Thai
Attorney, Agent, or Firm—Steven B. Samuels; Mark T. Starr; Sterne, Kessler, Goldstein & Fox P.L.L.C.

[57] ABSTRACT

A system and method for optimizing the amount of time it takes for a requestor (device) to receive data from a memory storage unit in a multi-requestor bus environment. The present invention provides a unidirectional response signal, referred to as an early warning signal, sent from a memory storage unit to a device, sometime after that device has executed a fetch request for data, to alert the device that the data is forthcoming. This early warning signal allows the device to arbitrate for the data bus so that when the data arrives, the device will have exclusive ownership of the data bus to accept the data immediately. The present invention comprises a main memory, a cache memory, one or more processor modules, one or more I/O modules, and an early warning bus. The cache memory is connected to the main memory via an interface bus. The processor modules are connected to the cache memory via a processor interface bus. The I/O modules are connected to the main memory via an I/O interface bus. Both the processor modules and the I/O modules include means for requesting a data unit from the main memory. The early warning bus is connected between the main memory, the cache memory, and the I/O module.

9 Claims, 7 Drawing Sheets

U.S. PATENT DOCUMENTS

| | | | |
|---|---|---|---|
| 4,240,143 | 12/1980 | Besemer et al. | 711/200 |
| 4,245,306 | 1/1981 | Besemer et al. | 711/200 |
| 4,253,144 | 2/1981 | Bellamy et al. | 711/200 |
| 4,253,146 | 2/1981 | Bellamy et al. | 364/200 |
| 4,392,196 | 7/1983 | Glenn et al. | 711/200 |
| 4,441,155 | 4/1984 | Fletcher et al. | 711/122 |
| 4,464,717 | 8/1984 | Keeley et al. | 711/122 |
| 4,466,059 | 8/1984 | Bastian et al. | 711/118 |
| 4,488,217 | 12/1984 | Binder et al. | 711/200 |
| 4,562,536 | 12/1985 | Keeley et al. | 711/141 |
| 4,564,903 | 1/1986 | Guyette et al. | 711/201 |
| 4,586,133 | 4/1986 | Steckler | 74/200 |
| 4,667,288 | 5/1987 | Keeley et al. | 711/154 |
| 4,686,621 | 8/1987 | Keeley et al. | 74/122 |
| 4,843,541 | 6/1989 | Bean et al. | 710/36 |
| 4,875,155 | 10/1989 | Iskiyan et al. | 711/122 |
| 4,967,414 | 10/1990 | Lusch et al. | 371/51.1 |
| 5,016,167 | 5/1991 | Nguyen et al. | 711/151 |
| 5,047,920 | 9/1991 | Funabashi | 711/117 |
| 5,060,136 | 10/1991 | Furney et al. | 74/118 |
| 5,067,071 | 11/1991 | Schanin et al. | 711/700 |
| 5,136,701 | 8/1992 | Kawai et al. | 710/27 |
| 5,142,676 | 8/1992 | Fried et al. | 711/154 |
| 5,237,670 | 8/1993 | Wakerly | 710/100 |
| 5,251,308 | 10/1993 | Frank et al. | 711/163 |
| 5,257,361 | 10/1993 | Doi et al. | 711/154 |
| 5,276,884 | 1/1994 | Mohan et al. | 711/163 |
| 5,327,538 | 7/1994 | Hamaguchi et al. | 710/107 |
| 5,392,416 | 2/1995 | Doi et al. | 711/122 |
| 5,408,629 | 4/1995 | Tsuchiya et al. | 711/118 |
| 5,434,976 | 7/1995 | Tan et al. | 395/200.64 |
| 5,450,551 | 9/1995 | Amini et al. | 710/119 |
| 5,465,336 | 11/1995 | Imai et al. | 711/167 |
| 5,490,280 | 2/1996 | Gupta et al. | 395/23 |
| 5,497,472 | 3/1996 | Yamamoto et al. | 711/119 |
| 5,499,354 | 3/1996 | Aschoff et al. | 74/141 |
| 5,504,874 | 4/1996 | Galles et al. | 74/140 |
| 5,537,569 | 7/1996 | Masubuchi | 711/121 |
| 5,568,633 | 10/1996 | Boudou et al. | 711/141 |
| 5,581,725 | 12/1996 | Nakayama | 711/122 |
| 5,717,897 | 2/1998 | McCrory | 711/121 |
| 5,717,942 | 2/1998 | Haupt et al. | 395/23 |
| 5,737,634 | 4/1998 | Hamano et al. | 710/27 |
| 5,787,265 | 7/1998 | Leshem | 710/113 |
| 5,793,992 | 8/1998 | Steele et al. | 710/113 |
| 5,794,071 | 8/1998 | Watanabe et al. | 710/27 |

SYSTEM AND METHOD FOR PROVIDING SPECULATIVE ARBITRATION FOR TRANSFERRING DATA

CROSS-REFERENCE TO OTHER APPLICATIONS

The following applications have a common assignee and contain some common disclosure:

"A Directory-Based Cache Coherency System," U.S. Ser. No. 08/965,004, filed Nov. 5, 1997 and incorporated herein by reference in its entirety;

"Split Lock Operation to Provide Exclusive Access to Memory During Non-Atomic Operations," U.S. Ser. No. 08/964,623, filed Nov. 5, 1997 and incorporated herein by reference in its entirety;

"Message Flow Protocol for Avoiding Deadlocks," U.S. Ser. No. 08/964,606, filed Nov. 5, 1997 and incorporated herein by reference in its entirety; and "Memory Bit Optimization," U.S. Ser. No. 08/964,626, filed Nov. 5, 1997 and incorporated herein by reference in its entirety.

BACKGROUND OF THE INVENTION

1. Field of the Invention

The present invention relates generally to multiple processor systems, and more particularly to a technique for accelerating data transfers from a memory storage unit to a device in a multiple processor system.

2. Related Art

In multiple processor systems, devices, such as microprocessors, memory banks, and peripheral control units, are interconnected via a plurality of buses. Such systems employ rules for allocating machine resources, such as memory or data buses, known as arbitration. In multiple processor bus environments, where multiple devices are competing for bus access for data transfer, each device must arbitrate to obtain ownership of the bus. For example, when a processor requests a unit of data from memory, some time later that data is delivered to the processor. Once the memory unit receives the request for data, the memory unit must read the data location, access the physical data, and deliver the data to the processor. Memory latency between when a request for data is received and when the data is transmitted can be time consuming.

Before the data can be delivered to the processor from the memory (or cache), the bus agent delivering the data must arbitrate to gain ownership of the data bus. Arbitration can be time consuming. In a directory based system where the memory controller stores the directory information in the same medium as the data itself the memory controller will obtain the directory information at the same instant it obtains the associated data for transfer to a requesting processor. If the directory state is not proper then the data which is read is not forwarded and action is taken to put the directory in the proper state to satisfy the request. The majority of the time however the data is able to be forwarded to the processor. If the memory controller waited until it observed the directory information before beginning arbitration it would waste the time of arbitration in satisfying the request. If the memory controller had direct control of arbitration it could begin arbitration to have the data bus available when the data was available from it's storage medium and either deliver the data on the bus without losing the time of arbitration or release the bus without data transfer if the directory state is not proper. In large multiprocessor systems the memory controller becomes separated from the processor bus by intervening busses such that a method and system are needed to speculatively arbitrate the processor bus for data delivery.

SUMMARY OF THE INVENTION

Briefly stated, the present invention is directed to a system and method for optimizing the amount of time it takes for a requestor (device) to receive data from a memory storage unit in a multi-requestor bus environment. The present invention provides a unidirectional signal, referred to as an early warning signal, sent from a memory storage unit to a bus agent on a processor bus after that agent has requested data from the MSU on behalf of the processor. The signal alerts the bus agent that the data is forthcoming. This early warning signal allows the agent to arbitrate for the data bus so that when the data arrives, the agent will have arbitrated for ownership of the data bus and can deliver the data immediately.

In a preferred embodiment, the present invention comprises a main memory, a cache memory, one or more processor modules, one or more I/O modules, and an early warning bus. The cache memory is connected to the main memory via an interface bus. The processor modules are connected to the cache memory via a processor interface bus. The I/O modules are connected to the main memory via an I/O interface bus. Both the processor modules and the I/O modules include means for requesting a data unit from the main memory. The early warning bus is connected between the main memory and the cache memory.

The early warning bus includes a first field identifying the destination bus agent and a valid bit that when set to "1" indicates a valid early warning signal.

The requested data unit is transferred via the requesting interface bus subsequent to the early warning signal being transferred across the early warning bus. The early warning signal enables the bus agent to arbitrate for the data bus prior to receiving the requested data unit.

In order to account for the speculative nature of the early warning signal the invention is further comprised of a timer in the arbitration logic of the agent that is set when the early warning signal is received and causes the agent to release the bus or cancel its arbitration attempt when the timer expires if the requested data has not yet been received. The invention also requires the ability of the agent to arbitrate for the bus and deliver data when it is received from the main memory without a warning signal.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The preferred embodiment of the present invention is discussed in detail below. While specific configurations are discussed, it should be understood that this is done for illustration purposes only. A person skilled in the relevant art will recognize that other components and configurations may be used without parting from the spirit and scope of the invention.

The present invention is directed to a system and method for optimizing the amount of time it takes for a requestor (device) to receive data from a memory storage unit in a multi-requestor bus environment. The present invention provides a uni-directional response signal, referred to as an early warning signal, sent from a memory storage unit to a device, sometime after that device has executed a fetch request for data, to alert the device that the data is forthcoming. This early warning signal allows the device to arbitrate for the data bus so that when the data arrives, the device will have exclusive ownership of the data bus to accept the data immediately.

Figure 1:
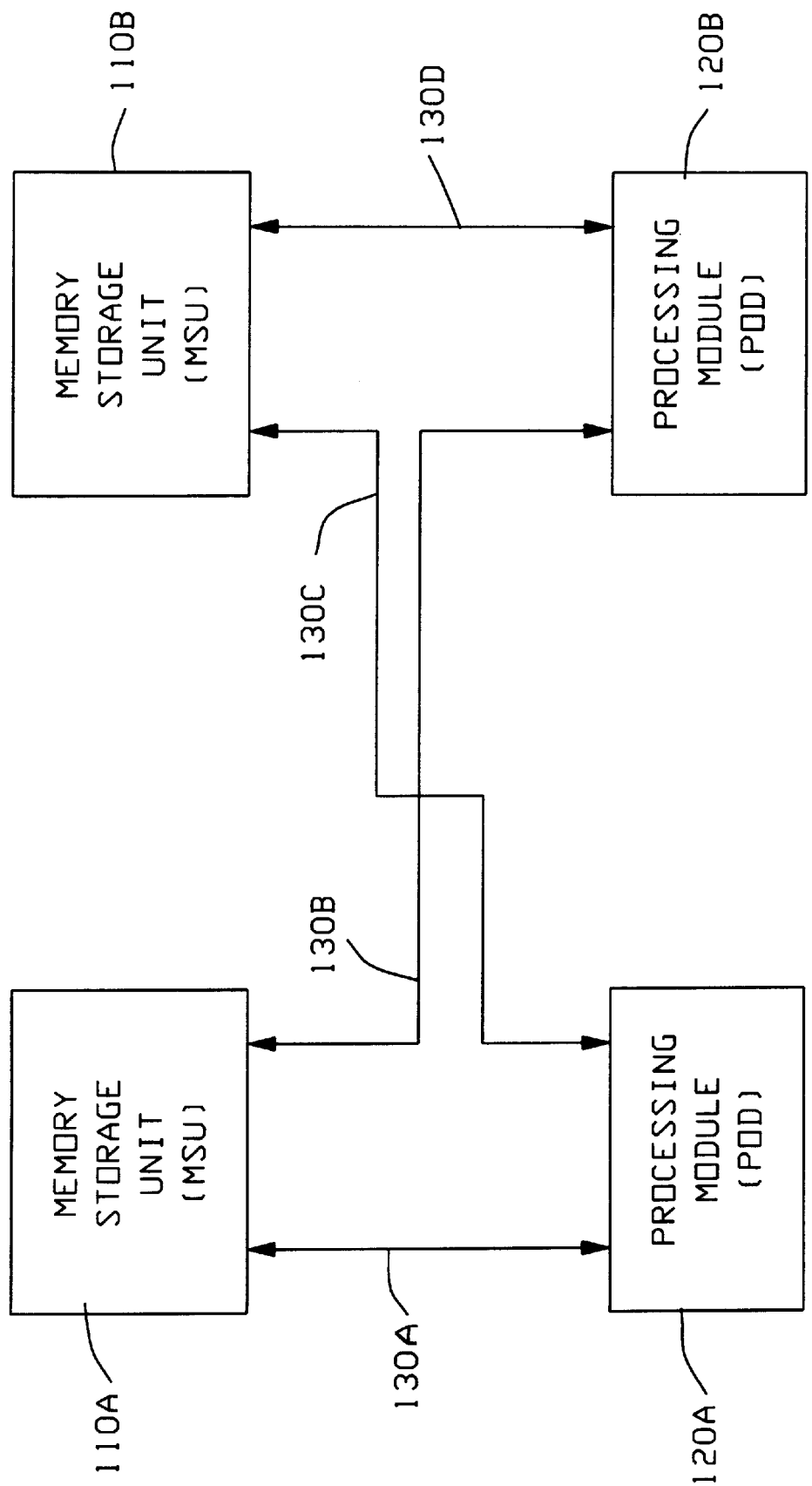
FIG. 1 is a block diagram of a system platform environment according to a preferred embodiment of the present invention.

Prior to describing the invention in detail, a description of an example system processing platform is provided. FIG. 1 is a block diagram of a system processing platform 100 in which the present invention is used. System processing platform 100 is useful for managing data flow among multiple processing systems and multiple memory storage systems. System processing platform 100 comprises one or more memory storage units (MSU) 110 (shown as MSU 110A and MSU 110B) and one or more processing modules (POD) 120 (shown as POD 120A and POD 120B). Customers can grow their system processing platform 100 by adding additional MSUs 110 and PODs 120.

Each MSU 110 is connected to each POD 120 via a MSU interface (MI) bus 130 (shown as Mr bus 130A, 130B, 130C, and 130D). MI bus 130 is a point-to-point interface that has separate address/function and data buses. MI bus 130 is comprised of a uni-directional control bus, a bi-directional request bus, and a bi-directional data bus. The request bus runs at system clock frequency (SYSCLK) while the data bus runs source synchronous at two times the system clock frequency. In a preferred embodiment, in system processing platform 100, system clock frequency is 100 megahertz (MHZ).

POD 120 has direct access to data in any MSU 110 via one of MI bus 130. For example, MI bus 130A allows POD 120A direct access to MSU 110A and MI bus 130C allows POD 120A direct access to MSU 110B.

Figure 2:
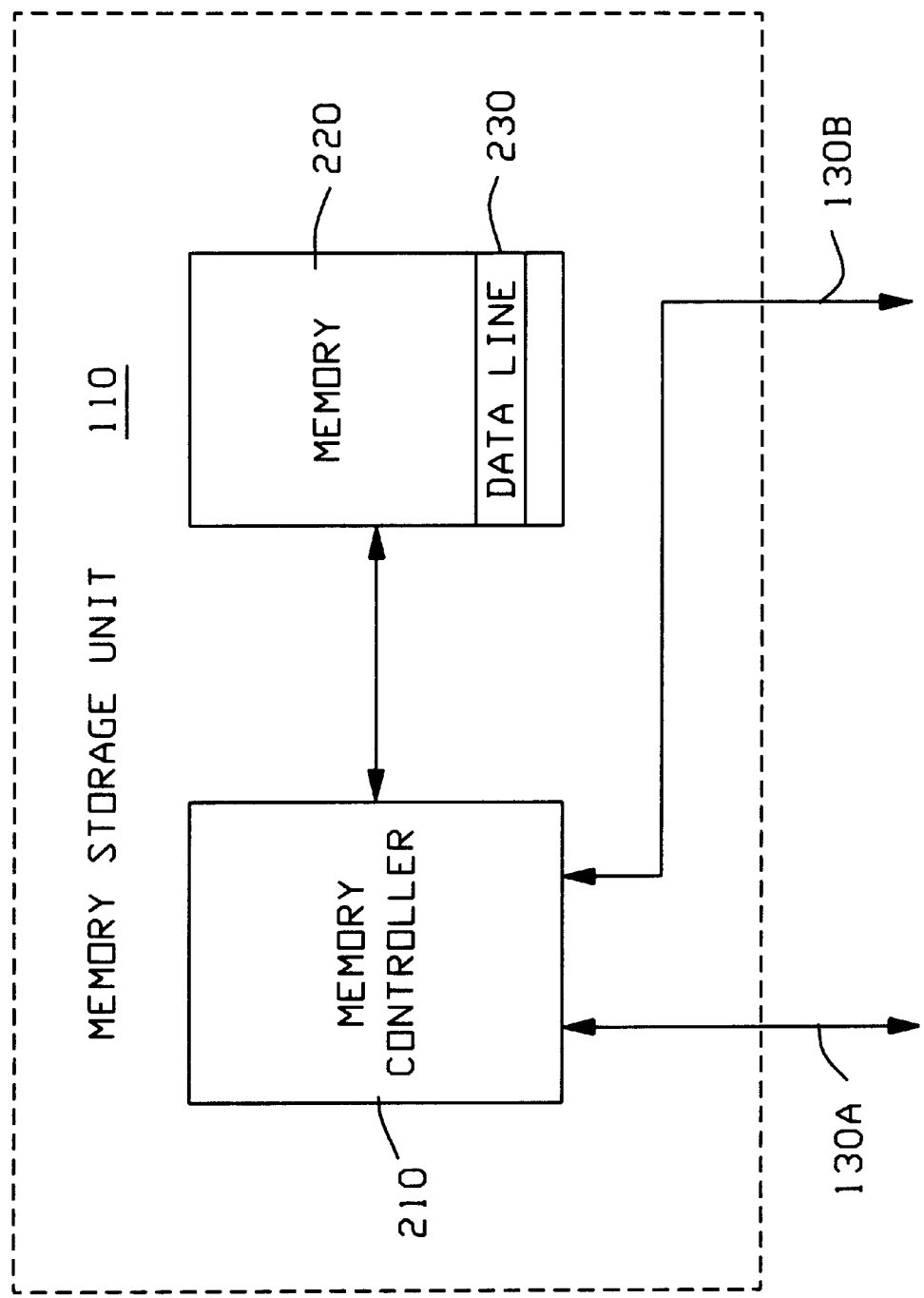
FIG. 2 illustrates an embodiment of a memory storage unit.

FIG. 2 illustrates memory storage unit (MSU) 110 in further detail. MSU 110 includes a memory controller 210 and a memory 220. Memory 220 comprises a plurality of data lines 230. Each data line 230 is the smallest quantum of data transferred among MSUs 110 and PODs 120 in system processing platform 100. In system processing platform 100, data line 230 is equivalent to 64 bytes of information.

Memory controller 210 operates as the memory manager of memory 220. Memory controller 210 receives the control and address lines via MI bus 130 from POD 120. Memory controller 210 controls and monitors the status of each data line 230 in a manner discussed in detail below.

Figure 3:
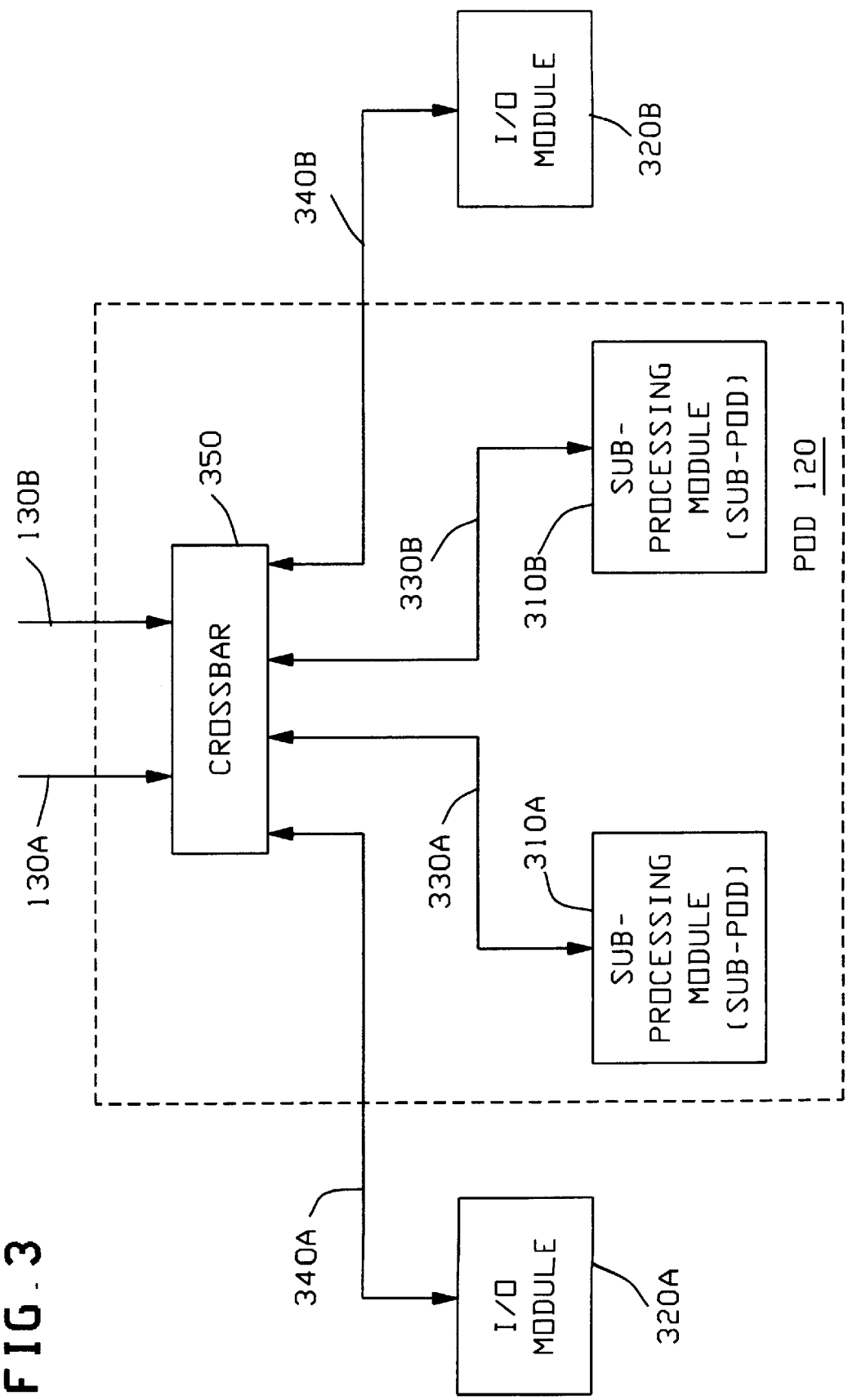
FIG. 3 illustrates an embodiment of a processing module.

A detailed block diagram of POD 120 is shown in FIG. 3. POD 120 comprises a crossbar 350, one or more sub-processing modules (sub-POD) (shown as sub-POD 310A and sub-POD 310B), and one or more input/output (I/O) modules 320 (shown as I/O module 320A and I/O module 320B). In system processing platform 100, each POD 120 contains two sub-PODs 310 and two I/O modules 320.

Crossbar 350 connects sub-POD 310 and 1/0 module 320 to MSU 110 via MI bus 130. Sub-POD 310 (shown as sub-POD 310A and sub-POD 310B) is connected to crossbar 350 via interface 330 (shown as interface 330A and interface 330B). Crossbar 350 interfaces I/O module 320 (shown as I/O module 320A and I/O module 320B) via interface 340 (shown as interface 340A and interface 340B). In system processing platform 100, MI bus 130 and interface 330 transfer data at equivalent transfer rates. Interface 340, between I/O module 320 and crossbar 350, has a similar configuration to MI bus 130 and interface 330, but operates at half the transfer rate.

Figure 4:
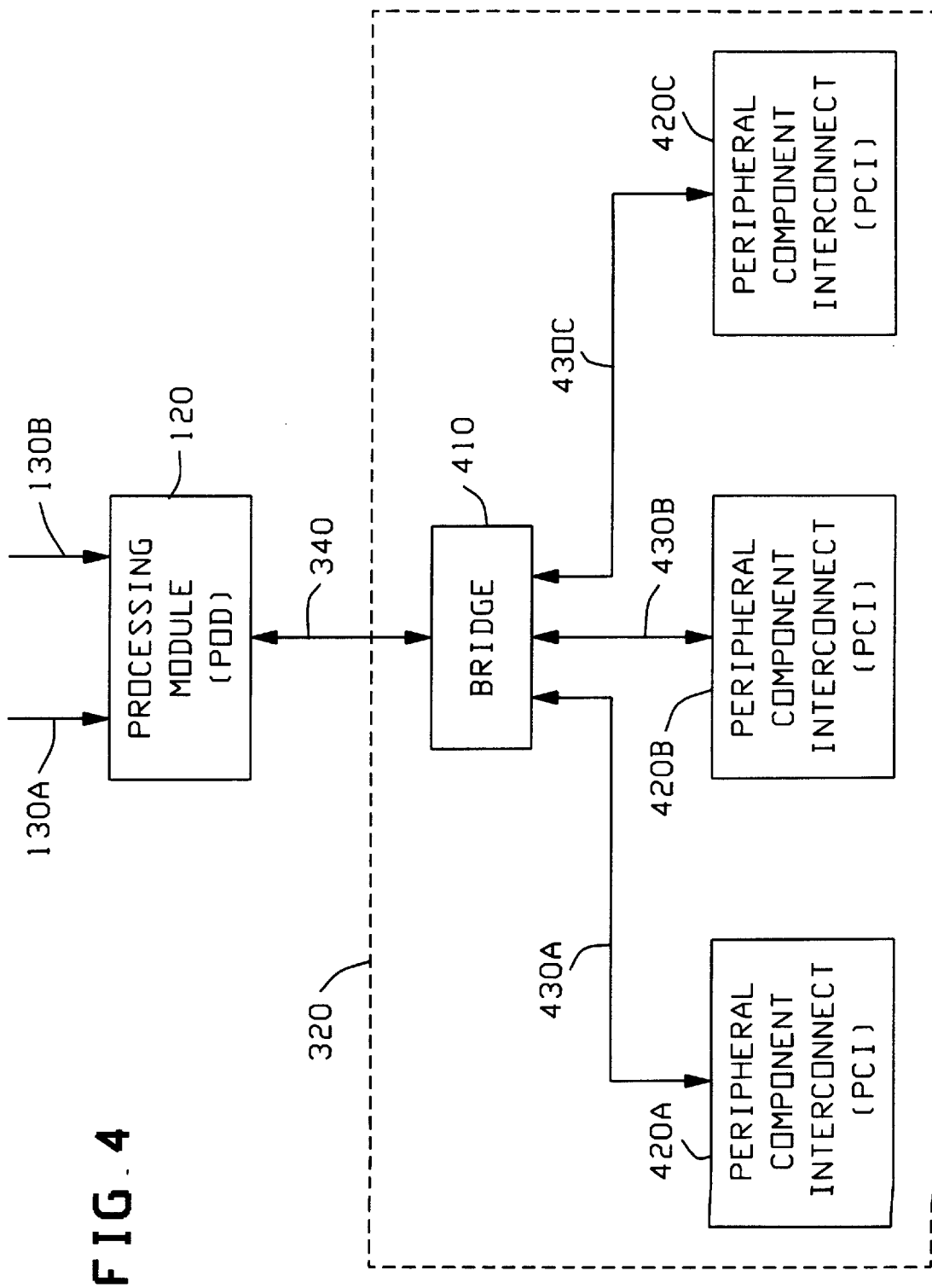
FIG. 4 illustrates an embodiment of an I/O module.

I/O module 320 is shown in FIG. 4. I/O module 320 functions as an interface between POD 120 and one or more I/O devices (not shown) connected to I/O module 320. I/O module 320 comprises a bridge 410 that interconnects one or more peripheral component interconnects (PC) (shown as PCI 420A, PCI 420B, and PCI 420C) via bus 430 (shown as bus 430A, bus 430B, and bus 430C). Bridge 410 is also connected to crossbar 350 in POD 120 via bus 340 as shown in FIG. 3. Bridge 410 functions as a switch between bus 340 and bus 330 that allows POD 120 access to each PCI 420.

Peripheral component interconnect (PCI) 420 is an I/O bus that connects various I/O devices (not shown) to I/O module 320. In system processing platform 100, each PCI 420 can support up to four devices. These devices include, but are not limited to, monitors, keyboards, printers, disk or tape drives, etc.

Figure 5:
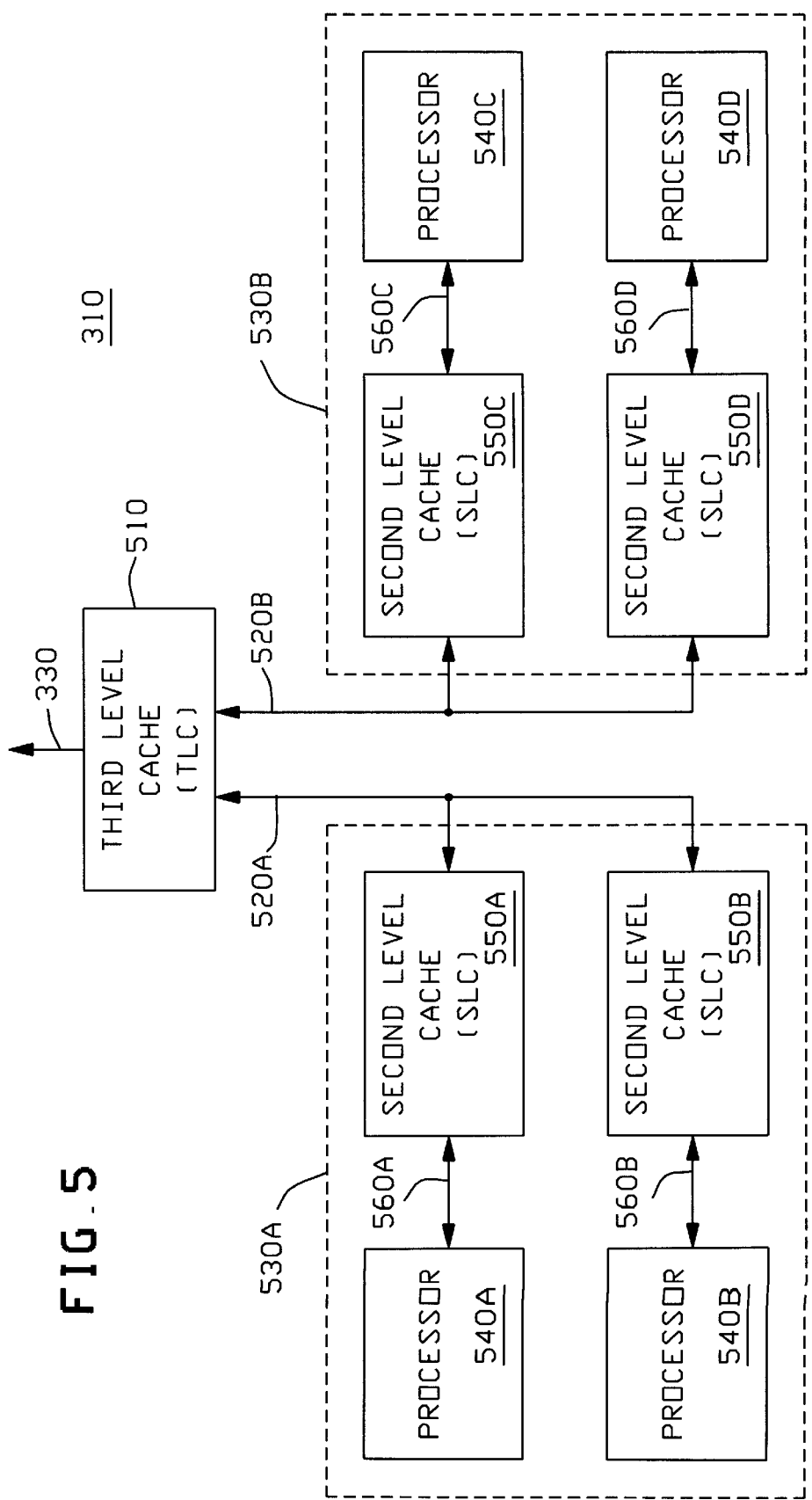
FIG. 5 illustrates an embodiment of a sub-processing module.

A block diagram of sub-POD 310 is shown in FIG. 5. Sub-POD 310 comprises a third level cache (TLC) 510 and one or more coherent domains 530 (shown as coherent domain 530A and coherent domain 530B). TLC 510 is connected to each coherent domain 530 via bus 520 (shown as bus 520A and bus 520B). TLC 510 maintains coherency among each coherent domain 530. Each coherent domain 530 comprises two or more second-level caches (SLC) 550 (shown as SLC 550A and SLC 550B in coherent domain 530A and as SLC 550C and SLC 550D in coherent domain 530B) and a processor 540 connected to each SLC 550 (shown as processor 540A and processor 540B in coherent domain 530A and as processor 540C and processor 540D in coherent domain 530B) via bus 560 (shown as bus 560A and bus 560B in coherent domain 530A and as bus 560C and bus 560D in coherent domain 530B). Each bus interface 520 supports up to two processor/SLC (540/550) configurations in a coherent domain 530. Processor module 540 can contain, for example, one of a Deshutes style P6, a Merced style P7, a Voyager style 2200, or a Capricorn style A series instruction processor. All four types of instruction processors are well known to person(s) skilled in the relevant art(s).

SLCs 550 in each coherent domain 530 maintain coherence among themselves as well as within their own coherent domain. This is accomplished by sharing bus 520 and following a snoopy-based coherence. According to a snoopy-based coherence, each SLC 550 "snoops" request bus 520 to ascertain the status of data line 230, and to update the status of a data line stored therein, if necessary. A more detailed discussion of the snoopy protocol is contained in copending application entitled, "A Directory-Based Cache Coherency System," filed concurrently herewith (U.S. Ser. No. 08/965,004) the entirety of which is incorporated herein by reference.

Figure 6:
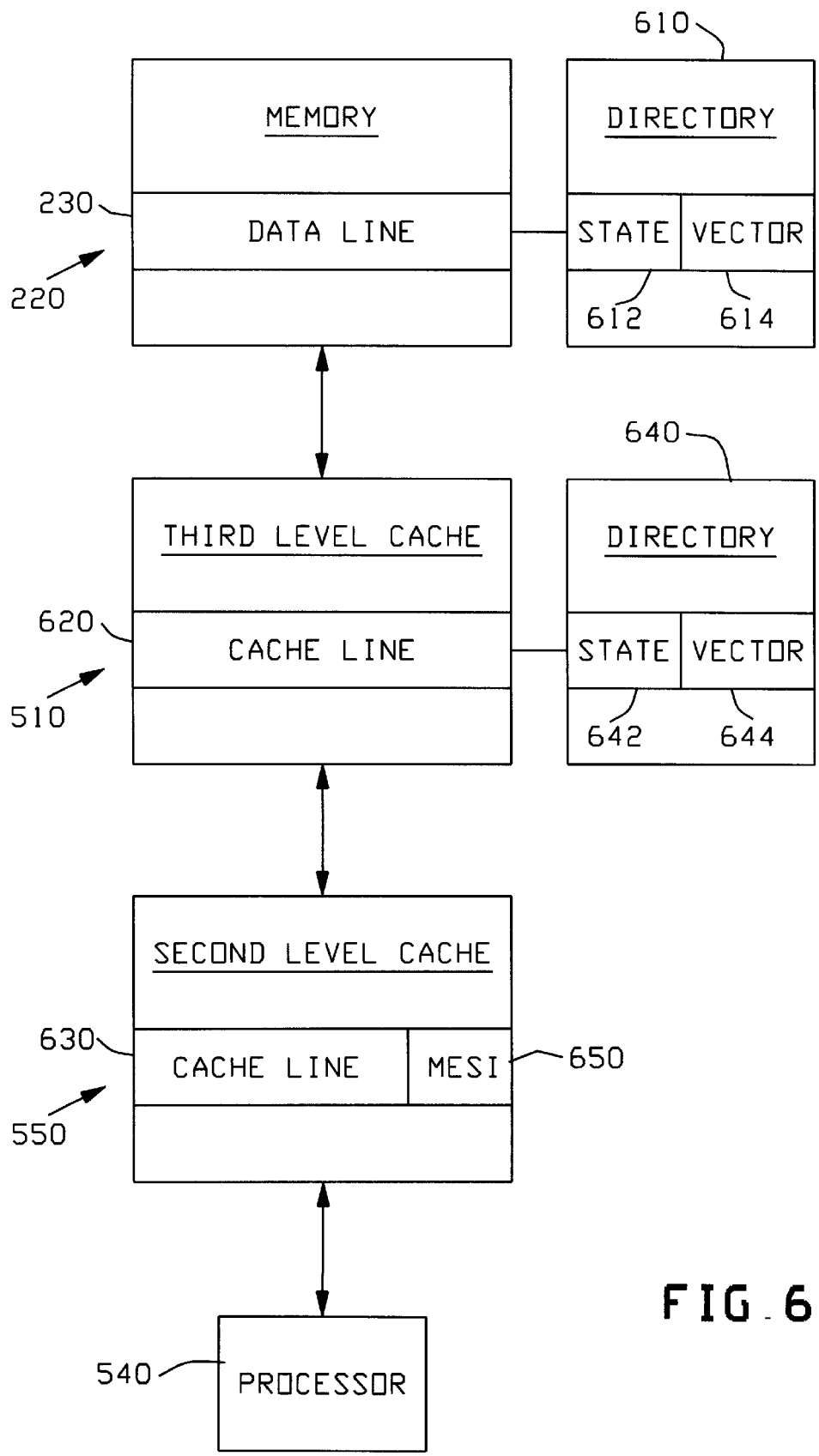
FIG. 6 illustrates an embodiment of a directory-based memory and cache system.

PODs 120 and MSUs 110 cooperate to produce a coherent memory system. The coherency scheme of system processing platform 100 is a directory-based, ownership protocol. FIG. 6 illustrates the directory-based ownership protocol used in system processing platform 100. Memory 220 and each level of cache (i.e., TLC 510, SLC 550, etc.) allow for a directory protocol for maintaining coherence. As shown in FIG. 6, memory 220 has a memory directory 610, TLC 510 has a TLC directory 640, and SLC 550 has an SLC directory 650, entitled MESI (Modified Exclusive Shared Invalid).

In a preferred embodiment, each cache 510 and 550 includes a memory for storing a data line, referred to as a cache line (shown as cache line 620 in TLC 510 and as cache line 630 in SLC 550). A cache line is a copy of the data line that exists in one or more caches 510, 550.

In directory 610, information about each data line 230 is monitored and updated using a state 612 and a vector 614. State 612 maintains information concerning the status of access granted to a requester with respect to data line 230. Such status may include present, shared, and exclusive. Present status indicates that data line 230 only exists in memory 220. Shared status indicates that a read only copy of data line 230 exists in one or more PODs 120. This indicates that these one or more PODs 120 may freely read a copy of data line 230. Exclusive status indicates that only a single requestor has been granted write access to data line 230. This indicates that a single requester has the right to modify data line 230. Vector 614 is a pointer to a sub-POD 310, who has been granted write access, when the memory state 612 indicates an exclusive status. Vector 614 is a mask, whose bits indicate which sub-PODs 310 have a read only copy, when memory state 612 indicates a shared status.

In TLC directory 640, information about each cache line 620 is monitored and updated using a state 642 and a vector 644. State 642 maintains three pieces of information concerning the status of cache line 620. This information includes ownership rights, data status, and bus rights. Vector 644 points to one or more locations where cache line 620 exists.

Ownership rights may include exclusive, shared, and unknown. Exclusive rights indicate that TLC 510 has exclusive rights (i.e., write access) to cache line 620 and this exclusive right coincides with the corresponding status of data line 230 in memory 220. Shared rights indicate that memory 220 associates cache line 620 as being shared (i.e., read only access). Unknown rights indicate that ownership rights for cache line 620 are unknown.

Data status for LC directory 640 may include no data, modified data, or clean data. No data indicates that no data is present on cache line 620. Modified data means that the data on cache line 620 has been modified. Modified data must be written back to memory 220. Clean data indicates that the data on cache line 620 has not been modified.

Bus rights indicate whether rights have been granted to one of bus 520A or 520B. Bus rights also include a state and vector (both state and vector are not shown). Bus rights may include states of exclusive, shared, or unknown. Exclusive rights indicate that exclusive ownership belongs to SLC 550 associated with one of bus 520A and 520D. Shared rights indicate that rights have been granted to both bus 520A and 520B. Unknown rights indicate that it is unknown as to which bus has rights.

In SLC directory 650, only the state of cache line 630 is maintained. The states may include modified, exclusive, shared, or invalid. Modified status indicates that the data on cache line 630 has been modified. Exclusive status indicates that the data on cache line 630 can be modified and that associated SLC 550 is the only device in which the data is contained. Shared status indicates that the data on cache line 630 is being shared among devices. Invalid status indicates that the copy of data line 230 found in cache line 630 in SLC 550 is no longer valid due to a write performed on data line 230 in another device.

Caching schemes were developed to reduce the time required by a processor, such as processor 540, to read data line 230 in memory 220. Caching systems, such as the one used in system processing platform 100, must maintain coherent data within each of memory 220, TLC 510, and SLC 550 to enable system processing platform 100 to perform properly and efficiently.

Coherency is a term well known in the art and governs the accessing of data in systems with multiple memory and processing devices. A coherent system requires that a read of a data line return the value of that data line most recently written, and a write of a data line invalidate all copies of that data line possessed by all agents having read access. With respect to processing system platform 100, coherency means that before POD 120 allows one of its requesters to modify cache line 620 or 630 within any of caches 510 and 550, POD 120 must obtain ownership permission (specifically, exclusive ownership) from MSU 110 for this data. Once exclusive ownership has been granted, POD 120 requesters are allowed to change cache line 620 without interacting with MSU 110. When POD 120 is through with cache line 620, cache line 620 is written back to MSU 110.

MSU 110 keeps track of cache line 620 state information on TLC 510 and I/O bus interface 340. MSU 110 does this by using directory structure 610. Directory 610 maintains information as to whether MSU 110, a particular TLC 510, or a particular I/O bus interface 340 own data line 230. Directory 610 will maintain information as to which, if any, of TLCs 510 have outstanding copies of data line 230 or if a particular I/O has a coherent copy outstanding. Directory 610 will also indicate whether a particular data line 230 contains an uncorrectable error.

The coherency scheme of system processing platform 100 allows for only one owner at a time and coherency is enforced on a cache line basis. Thus, if another TLC 510 or I/O bus interface 340 needs to have access to a modified cache line 620 or 630, it is the responsibility of MSUJ 110 to request the owner to return cache line 620 or 630 back to MSU 110 to route the new data to the requester. If the requestor wants to modify cache line 620 or 630, the original owner will purge (invalidate) corresponding cache line 620 or 630 from its caches. Then, if it needs access to that particular cache line 620 or 630 again, it will be forced to go to MSU 110 for the latest copy. If a requestor wants to read data line 230, the original owner is allowed to keep a copy of the corresponding cache line 620 or 630. In either case, the original owner has lost the privilege to modify any of the data in the corresponding cache line 620 or 630, and in order to do so, it must again request exclusive ownership rights from MSU 110.

The coherency scheme of system processing platform 100 is further described in copending application entitled, "A Directory-Based Cache Coherency System," filed concurrently herewith (U.S. Ser. No. 08/965,004).

The present invention is described in terms of the above example environment. Description in these terms is provided for convenience only. It is not intended that the invention be limited to application in this example environment. In fact, after reading the following description, it will become apparent to person(s) skilled in the relevant art(s) how to implement the invention with other memory storage units and processing module configurations. For example, the present invention has applicability in any system that utilizes a memory hierarchy that is connected to a plurality of processors. Multiple level caching is not required to implement the present invention.

Figure 7:
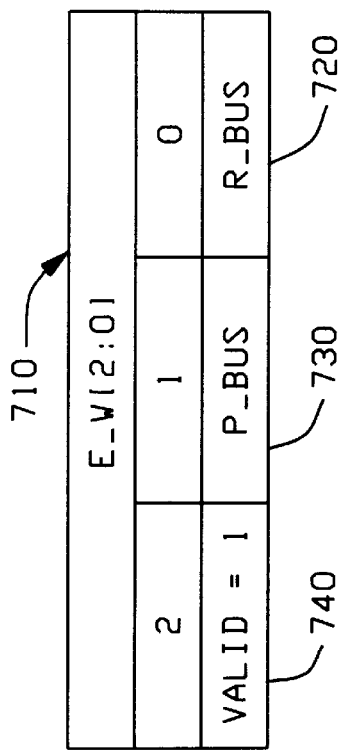
FIG. 7 illustrates a preferred embodiment of the present invention.

FIG. 7 illustrates a preferred embodiment of the present invention. As previously stated, the present invention is a system and method for accelerating data line 230 transfers from MSU 110 to POD 120 when data must be fetched from MSU 110. The present invention accelerates data transfers from MSU 110 to POD 120 by sending an early warning (E_W) signal when a request for data line 230 has been made. The early warning signal allows the requesting device (e.g., processor 540 or I/O module 320) to prepare for the arrival of data line 230 by arbitrating for the data bus so that when data line 230 is available, the device requesting data line 230 can accept it immediately.

A requesting device, such as processor 540 or I/O module 320, executes a fetch request for data from MSU 110. Before the data can be returned from MSU 110 to the requesting device, the requesting device must arbitrate for the data bus. The present invention provides an early warning signal that is transferred from MSU 110 to the requesting device across an early warning bus prior to the transfer of the requested data. The early warning signal enables the requesting device to arbitrate for the data bus prior to receipt of the requested data. Arbitration prior to receipt of the requested data allows the requesting device access to the data immediately upon its arrival.

In a preferred embodiment, the present invention is a subset of MI bus 130 (shown in FIG. 1). Alternatively, in another embodiment, the present invention can be a separate bus. The present invention provides an early warning uni-directional bus (E_W[2:0]) 710 from MSU 110 to POD 120. Early warning uni-directional bus 710 includes an R_bus signal 720, a P_bus signal 730, and a Valid signal 740.

R_bus signal 720 indicates which interface bus is requesting data. More specifically, R_bus signal 720 indicates which requestor bus (bus 340A and bus 340B for I/O module 320 or bus 330A and bus 330B for sub-POD 310) originated the request for data. P_bus signal 730 identifies the requesting device. More specifically, if R_bus 720 indicates that the data request was issued from I/O module 320, P_bus 730 indicates which one of I/O module 320 made the request. If R_bus 720 indicates that the data request came from TLC interface bus 330, P_bus 730 indicates which one of processor 540 made the request. Valid signal 740 is set to 1 to indicate that the signal is valid and to early warn that data is forthcoming.

In a preferred embodiment of the present invention, a timer (not shown) is used to release arbitration if the data does not arrive at the requesting device within a specified time frame. The timer starts on the receipt of the transition of Valid signal 740 from a 0 to a 1, indicating valid information on E_W bus 710. There are a number of reasons why the data may not be transferable within a specified amount of time. For example, if a copy of data line 230 is requested, and data line 230 is owned by another requester, then data line 230 that is currently in MSU 110 is not delivered to the first requester, since it is not necessarily an updated copy. The updated copy currently resides with the owner. However, E_W bus 710 is still sent to the requester at the same time as if the MSU 110 had sole possession of data line 230. Also, there is a timing window associated with the bi-directional nature of MI 130 that prevents the delivery of data line 230 to the requesting POD 120, but does not inhibit the sending of E_W bus 710. In cases such as these, requested data line 230 will not arrive immediately. Therefore, a timer is used to release arbitration in order to maximize utilization of the data bus.

Figure 8:
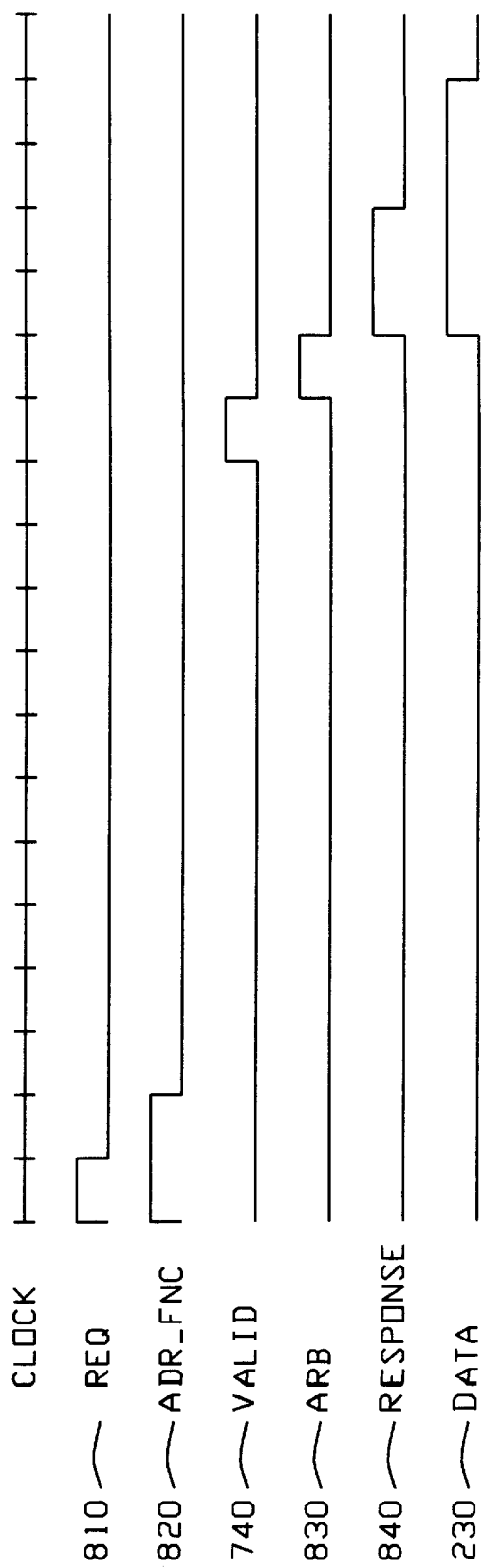
FIG. 8 illustrates a timing diagram for accelerating data transfers using a preferred embodiment of the present invention.

A timing diagram of a data transfer from MSU 110 to processor 540 implementing Valid signal 740 is shown in FIG. 8. A REQ signal 810 starts a request transaction from POD 120 to MSU 110. REQ signal 810 may be asserted in any clock cycle. In a preferred embodiment, REQ signal 810 is one clock cycle in length. Address and function (ADR_FNC) signal 820, on MI bus 130, take two clock cycles. In a preferred embodiment, REQ signal 810 is asserted during the first cycle of ADR_FNC signal 820. R_bus 720 and P_bus 730 are included in ADR_FNC signal 820. MSU 110 will place, on E_W[2:0] bus 710, R_bus 720 and P_bus 730 values obtained from ADR_FNC signal 820 and send an early warning via E_W[2:0] bus 710 to POD 120. Valid signal 740 appears two clock cycles prior to the arrival of data line 230. MSU 110 sends valid signal 740 after all internal data path routing priorities have been resolved using the assumption that MSU 110 owns data line 230. This is before MSU 110 knows whether it owns data line 230. The start of valid data 230 transferred to POD 120 is signified by a Response signal 840 from MSU 110 to POD 120. If MSU 110 finds out later in time that it does not own data line 230, it will inhibit Response signal 840. Response signal 840 is part of MI interface 130. Valid signal 740 triggers the requesting device to generate a bus arbitration signal 830. Bus arbitration signal 830 is a request from a requesting device to arbitrate for the data bus (e.g., processor bus 520). The data bus is now prepared to accept data line 230 immediately upon its arrival. If Response signal 840 does not arrive within the two clock timing window, relative to valid signal 740, then the data bus is released for other transfers.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A multiple processor system, comprising:

at least one memory storage device;

at least one cache memory connected to each of said at least one memory storage device via an interface bus;

at least one processor interface bus that connects one of said at least one cache memory to a plurality of processors, wherein each of said plurality of processors includes means for requesting data from said at least one memory storage device;

means for generating an early warning signal that notifies one of said plurality of processors that data requested by said one of said plurality of processors will soon be available and that said one of said plurality of processors should begin arbitrating for use of said processor interface bus to which said one of said plurality of processors is connected; and at least one early warning bus connecting one of said at least one memory storage devices to one of said at least one cache memory, whereby said early warning signal is transmitted.

2. The system of claim 1, further comprising a plurality of I/O modules connected to said at least one memory storage device via an I/O interface bus, each of said plurality of I/O modules having means for requesting data from each of said at least one memory storage device, wherein said requested data is transferred onto said I/O interface bus subsequent to said early warning signal being transferred across said early warning bus, whereby said early warning signal enables said I/O module to arbitrate for said I/O interface bus prior to receipt of said requested data.

3. The system of claim 1, wherein said early warning bus comprises:

data lines for identifying a requesting bus;

data lines for identifying a requesting device; and at least one data line for indicating that said requested data will be transferred from one of said at least one memory storage device, whereby said early warning signal is given to said requesting device.

4. The system of claim 3, further comprising a timer, wherein said timer begins counting when arbitration for use of said processor interface bus begins, and wherein said arbitration ends if said timer expires prior to the arrival of said requested data.

5. The system of claim 1, wherein said early warning bus is part of said interface bus between one of said at least one memory storage devices and one of said at least one cache memory.

6. A method for providing early warning regarding data transfer from a memory storage device to a device in a multiple processor processing system, the method comprising the steps of:

(1) requesting, by a device, data from the memory storage device;

(2) transmitting an early warning signal from the memory storage device to provide an indication to said requesting device that said requested data is forthcoming and that said requesting device should begin bus arbitration, including the steps of:

transmitting a first signal onto an early warning bus, said first signal identifying an interface bus from which said data was requested, transmitting a second signal onto said early warning bus, said second signal indenting said requesting device, and transmitting a third signal onto an early warning bus, said third signal indicating that a valid early warning is indeed given and that said requesting device should begin said bus arbitration;

(3) arbitrating, by said requesting device, for use of a bus interface; and (4) sending said requested data to said requesting device.

7. The method of claim 6, wherein step (3) comprises the steps of:

setting a timer when said bus arbitration begins; and releasing said bus arbitration if said timer expires prior to said requested data being sent in step (4).

8. A system for providing early warning regarding data transfer from a memory storage device to a device in a multiple processor processing system, the system comprising:

means for requesting, by a device, data from the memory storage device;

means for transmitting an early warning signal from the memory storage device to provide an indication to said requesting device that said requested data is forthcoming and that said requesting device should begin bus arbitration, said means for transmitting including:

means for transmitting a first signal onto an early warning bus, said first signal identifying an interface bus from which said data was requested, means for transmitting a second signal onto said early warning bus, said second signal identifying said requesting device, and means for transmitting a third signal onto an early warning bus, said third signal indicating that a valid early warning is indeed given and that said requesting device should begin said bus arbitration;

means for arbitrating, by said requesting device, for use of a bus interface; and means for sending said requested data to said requesting device.

9. The system of claim 8, wherein said means for arbitrating comprises:

means for setting a timer when said bus arbitration begins; and means for releasing said bus arbitration if said timer expires prior to said requested data being sent by said means for sending.

* * * * *